(12) United States Patent
Imamura

(10) Patent No.: US 8,559,658 B2
(45) Date of Patent: Oct. 15, 2013

(54) ELECTRONIC APPARATUS

(75) Inventor: Akira Imamura, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 272 days.

(21) Appl. No.: 12/970,791

(22) Filed: Dec. 16, 2010

(65) Prior Publication Data
US 2011/0158436 A1   Jun. 30, 2011

(30) Foreign Application Priority Data

Dec. 28, 2009 (JP) .................................. 2009-297098

(51) Int. Cl.
*H03F 3/68* (2006.01)

(52) U.S. Cl.
USPC ............... 381/120; 381/81; 381/85; 381/123; 700/94; 710/14

(58) Field of Classification Search
USPC ................... 381/58–59, 28, 120, 123, 77–78, 381/81–83, 85; 700/94; 710/14
See application file for complete search history.

(56) References Cited

U.S. PATENT DOCUMENTS

| | | | |
|---|---|---|---|
| 6,128,263 | A | 10/2000 | Fujii et al. |
| 6,523,125 | B1 | 2/2003 | Kohno et al. |
| 2001/0022842 | A1 | 9/2001 | Fujii |
| 2005/0111675 | A1* | 5/2005 | Lee ................. 381/104 |
| 2006/0080475 | A1* | 4/2006 | Lam et al. ........... 710/14 |
| 2007/0064955 | A1* | 3/2007 | Saito ................. 381/58 |
| 2009/0003619 | A1* | 1/2009 | Solow ............... 381/77 |
| 2009/0006874 | A1 | 1/2009 | Fujiwara |

FOREIGN PATENT DOCUMENTS

| | | |
|---|---|---|
| JP | 7-9618 | 2/1987 |
| JP | 02-260900 | 10/1990 |
| JP | 07-239737 | 9/1995 |
| JP | 11-086433 | 3/1999 |
| JP | 11-202965 | 7/1999 |
| JP | 2000-039935 | 2/2000 |
| JP | 2000-305672 | 11/2000 |
| JP | 2001-197599 | 7/2001 |
| JP | 2001-216132 | 8/2001 |
| JP | 2002-142161 | 5/2002 |

(Continued)

OTHER PUBLICATIONS

Japanese Patent Application No. 2009-297098; Notice of Reasons for Rejection; Mailed Nov. 8, 2011 (English translation).

(Continued)

*Primary Examiner* — Disler Paul
(74) *Attorney, Agent, or Firm* — Blakely, Sokoloff, Taylor & Zafman LLP

(57) ABSTRACT

According to one embodiment, an electronic apparatus includes a speaker, a terminal, an amplifier, a power supply circuit, a setting module, a detection module, and a controller. The terminal is configured to input an audio signal from an external device. The amplifier is configured to amplify the audio signal, and to output audio from the speaker. The power supply circuit is configured to supply power to the amplifier. The setting module is configured to set data which indicates whether audio output from the speaker is to be enabled or disabled when the apparatus is in a non-operative state. The detection module is configured to detect a predetermined state of the apparatus. The controller is configured to control the power supply circuit, based on the data and the predetermined state, in order to supply the power to the amplifier when the apparatus is in the non-operative state.

8 Claims, 8 Drawing Sheets

(56) References Cited

FOREIGN PATENT DOCUMENTS

| | | |
|---|---|---|
| JP | 2003-309892 | 10/2003 |
| JP | 2006-525598 | 11/2006 |
| JP | 2007-108769 | 4/2007 |
| JP | 2007-166557 | 6/2007 |
| JP | 2007-206896 | 8/2007 |
| JP | 2009-009532 | 1/2009 |
| JP | 2009-032239 | 2/2009 |
| JP | 2009-187283 | 8/2009 |

OTHER PUBLICATIONS

Japanese Patent Application No. 2009-297098; Notice of Reasons for Rejection; Mailed Aug. 9, 2011 (English translation).
Japanese Patent Application No. 2009-297098; Notice of Reasons for Rejection; Mailed Apr. 26, 2011 (English translation).

* cited by examiner

| State of PC | Presence/absence of plug | Power supply mode (A-power) | P-power | A-power | B-power | S-power |
|---|---|---|---|---|---|---|
| PC power-on | — | — | ON | ON | ON | ON |
| PC standby | Without plug insertion | OFF | OFF | OFF | ON | ON |
| | With plug insertion | ON | OFF | ON | ON | ON |
| PC hibernation | Without plug insertion | OFF | OFF | OFF | OFF | ON |
| | With plug insertion | ON | OFF | ON | OFF | ON |
| PC power-off | Without plug insertion | OFF | OFF | OFF | OFF | ON |
| | With plug insertion | ON | OFF | ON | OFF | ON |

FIG. 3

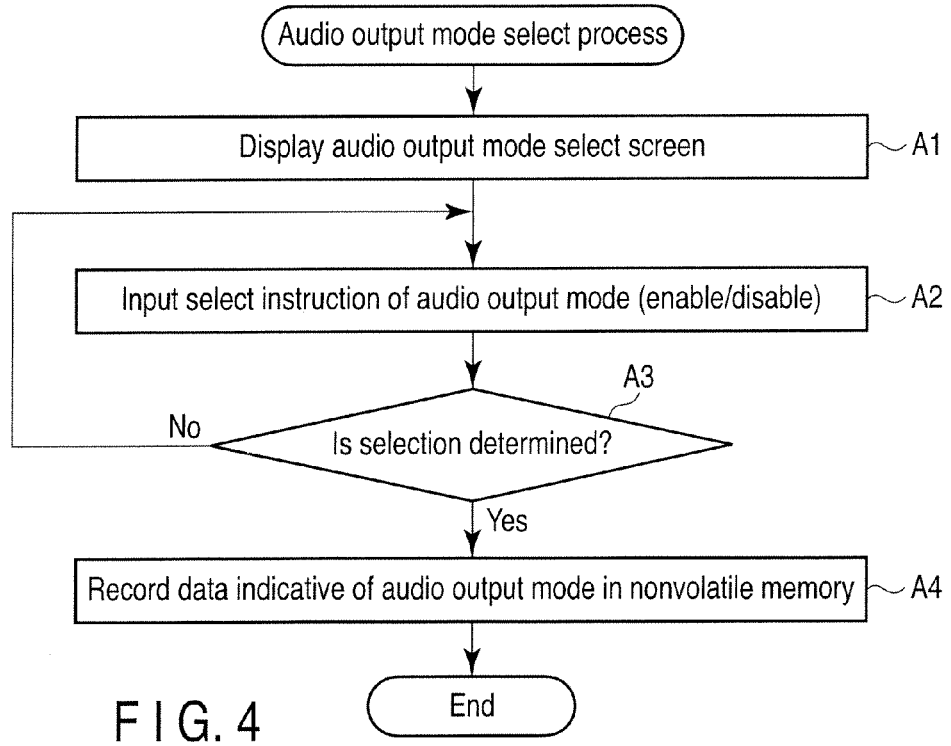

FIG. 4

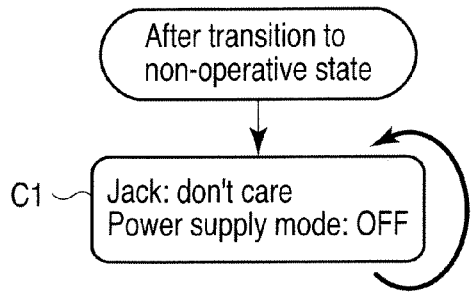
F I G. 7
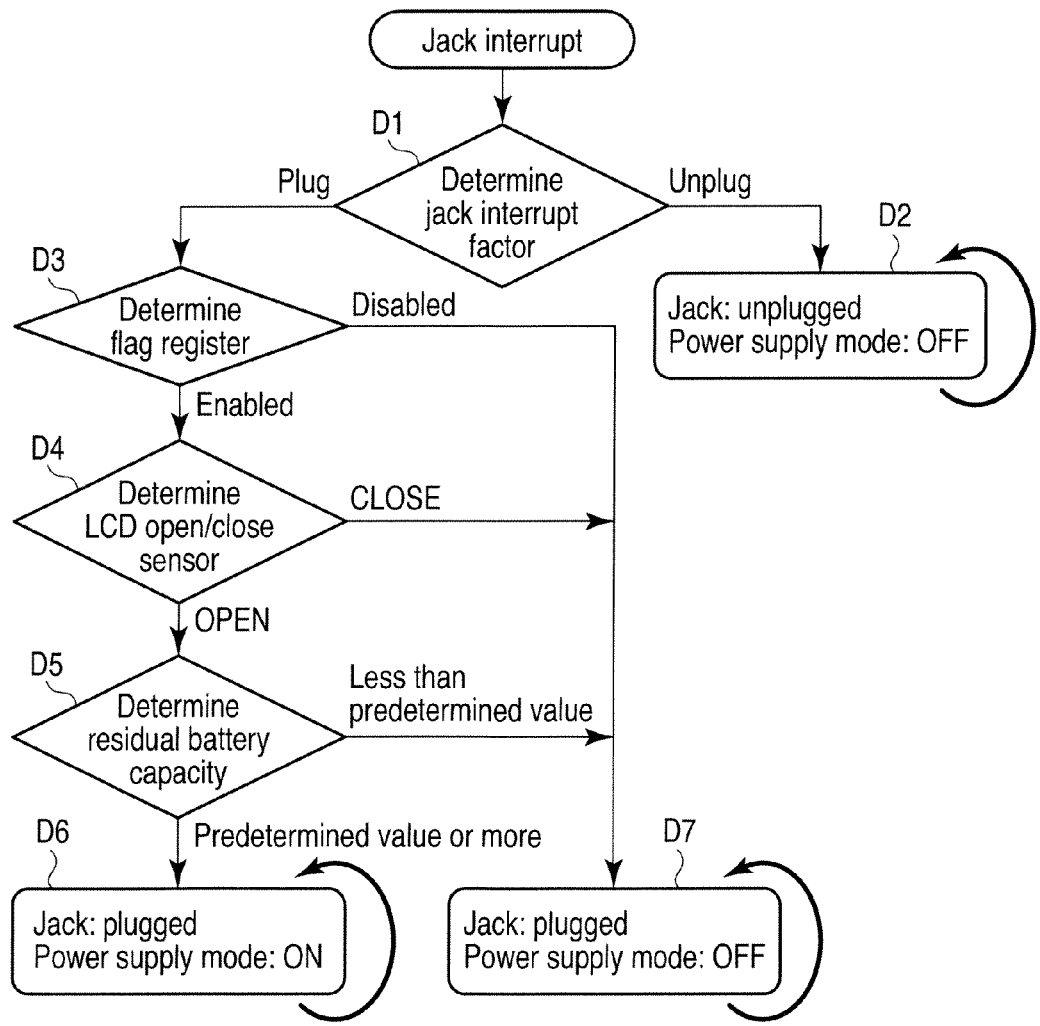
F I G. 8

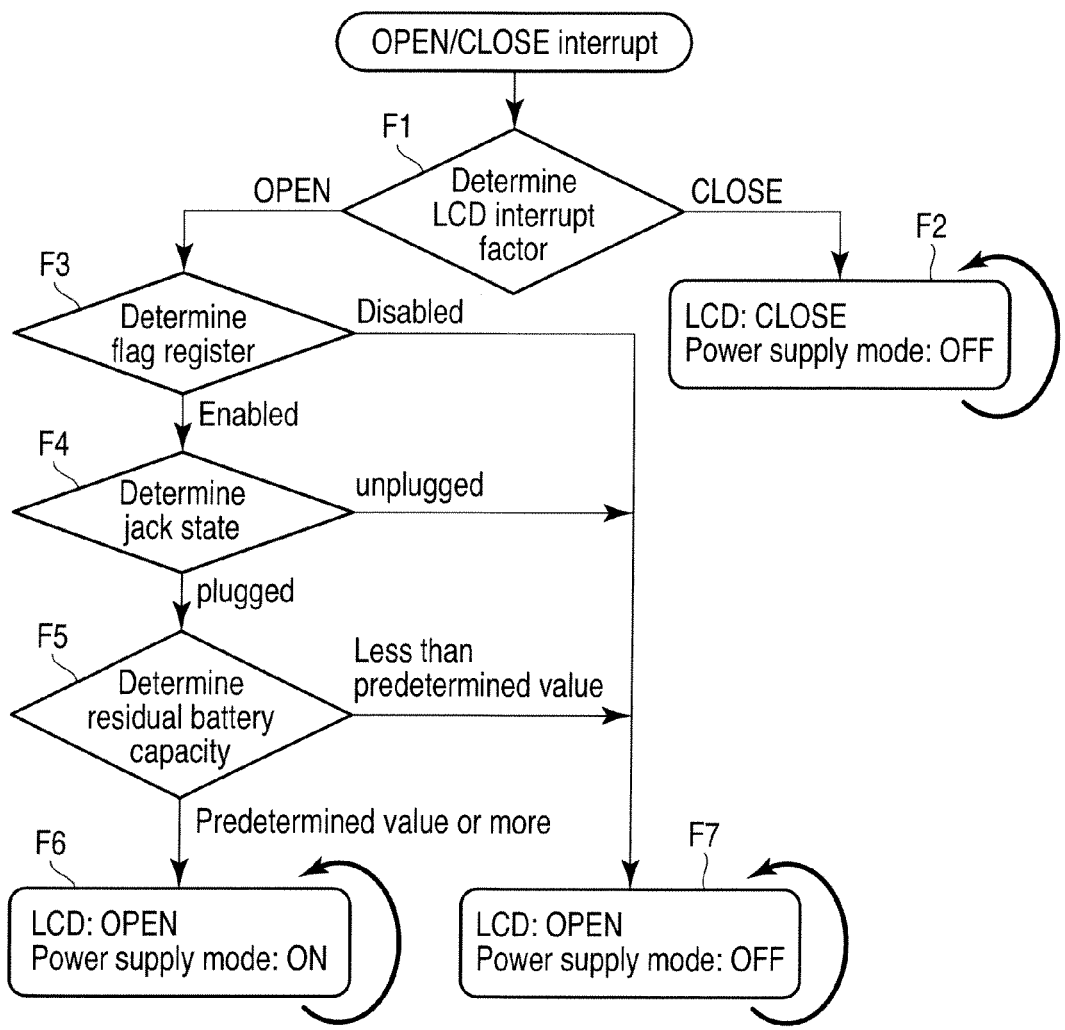
F I G. 9

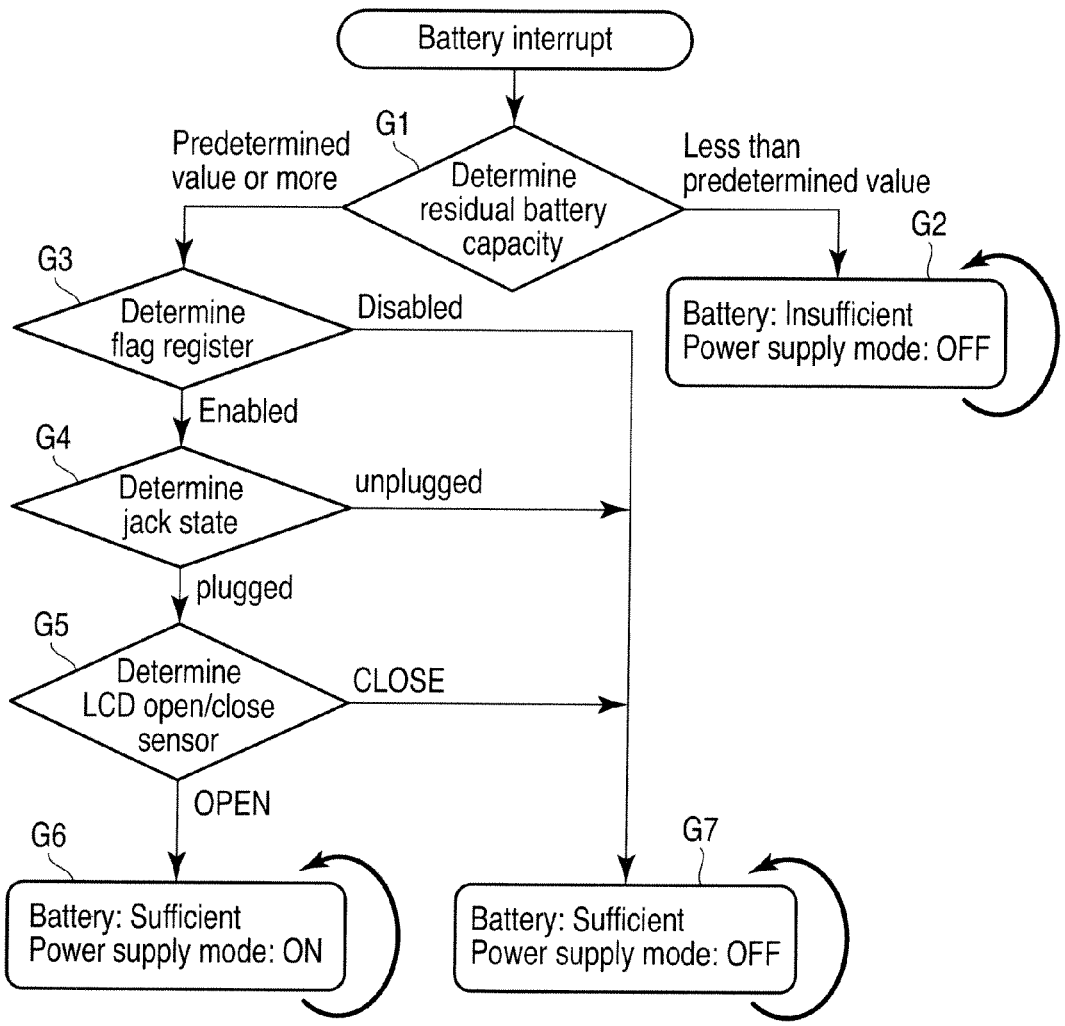
F I G. 10

ELECTRONIC APPARATUS

CROSS-REFERENCE TO RELATED APPLICATIONS

This application is based upon and claims the benefit of priority from Japanese Patent Application No. 2009-297098, filed Dec. 28, 2009; the entire contents of which are incorporated herein by reference.

FIELD

Embodiments described herein relate generally to an electronic apparatus having a speaker.

BACKGROUND

Conventionally, there is known an AV apparatus which can execute processes, when insertion/detachment of a plug in/from a terminal for receiving an audio signal from the outside is detected, by using the insertion/detachment of the plug as an effective trigger.

An AV apparatus disclosed in Jpn. Pat. Appln. KOKAI Publication No. 2007-108769 includes a processing module which executes a process for viewing/listening; a signal output module which outputs a signal to the processing module; a plurality of first signal input modules including a mobile audio input terminal; a first detection module which detects insertion/detachment of a plug in/from the mobile audio input terminal; and a second control module for controlling connection between the plural first signal input modules and the signal output module.

In the conventional AV apparatus, for example, when the plug is inserted in the mobile audio terminal, an audio signal, which is input from a mobile audio, can be output as an audio output signal of the AV apparatus. In addition, the AV apparatus can execute, as well as the process of outputting audio from the mobile audio, processes of stopping a process for video signals, turning off the backlight of a liquid crystal display, and turning on backlight.

However, in the conventional AV apparatus (e.g. TV apparatus), when the plug is inserted in the mobile audio terminal in a normal operative state in which video and audio can be output, the audio from the mobile audio can be output. In a non-operative state in which power is turned off, the audio from the mobile audio cannot be output.

In addition, in the conventional AV apparatus, the insertion of the plug in the mobile audio terminal is merely utilized as the expression of the user's intention to change the input source. The output of audio from the mobile audio cannot be controlled by utilizing the expression of the user's intention, other than the insertion of the plug.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary view showing powers which are supplied in the respective states of the personal computer according to the embodiment;

FIG. 4 is an exemplary flow chart illustrating an audio output mode select process in the embodiment;

FIG. 7 is an exemplary flow chart illustrating a control process for realizing Specification 1 in the embodiment;

FIG. 8 is an exemplary flow chart illustrating a control process for realizing Specification 1 in the embodiment;

FIG. 9 is an exemplary flow chart illustrating a control process for realizing Specification 2 in the embodiment;

FIG. 10 is an exemplary flow chart illustrating a control process for realizing Specification 3 in the embodiment.

DETAILED DESCRIPTION

Various embodiments will be described hereinafter with reference to the accompanying drawings.

In general, according to one embodiment, an electronic apparatus comprises a speaker, a terminal, an amplifier, a power supply circuit, a setting module, a detection module, and a controller. The terminal is configured to input an audio signal from an external device. The amplifier is configured to amplify the audio signal which is input from the terminal, and to output audio from the speaker. The power supply circuit is configured to supply power to the amplifier. The setting module is configured to set data which indicates whether audio output from the speaker is to be enabled or disabled when the electronic apparatus is in a non-operative state. The detection module is configured to detect a predetermined state of the electronic apparatus. The controller is configured to control the power supply circuit, based on the data and the predetermined state, in order to supply the power to the amplifier when the electronic apparatus is in the non-operative state.

An embodiment will now be described with reference to the accompanying drawings.

Figure 1:
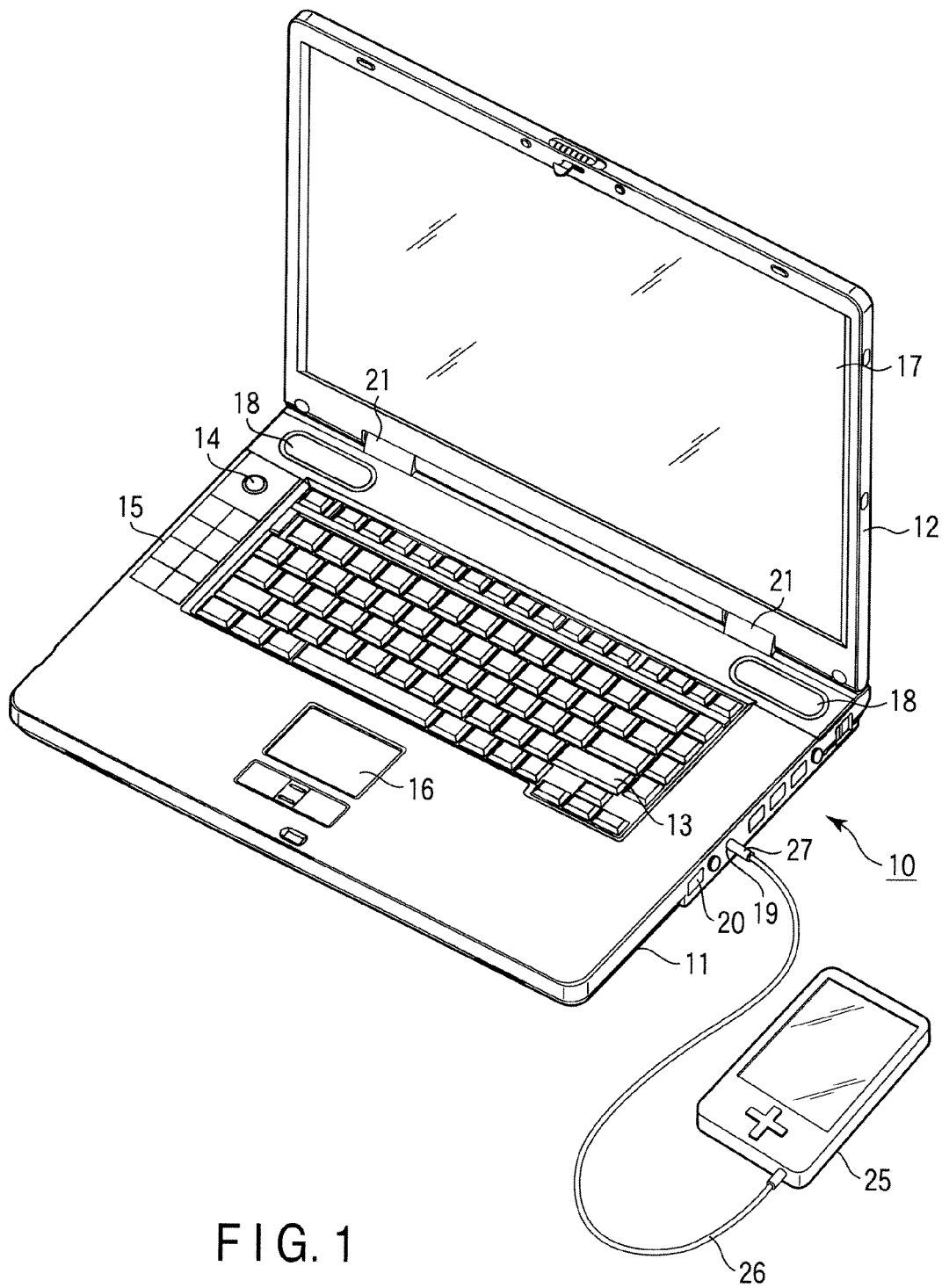
FIG. 1 is an exemplary external appearance view showing the structure of an electric apparatus according to an embodiment.

FIG. 1 is an external appearance view showing the structure of an electronic apparatus according to the embodiment. The electronic apparatus is realized, for example, as a notebook-type portable personal computer 10. The personal computer 10 in this embodiment has an audio output function (sleep & music function) for receiving, at a time of a non-operative state, an analog audio signal which is output from a line output-equipped external device (e.g. a portable audio player 25), and outputting the audio signal from speakers 18 which are mounted on the housing of the computer 10.

When the output from the audio player 25 is directly connected to the speakers, since the output of the audio player 25 is small, compared to the capability of the speakers, the speakers are unable to output sound of a sufficient volume. According to the audio output function that is provided in the personal computer 10 in this embodiment, even when the personal computer 10 is in the non-operative state, power is supplied to a built-in amplifier for audio signal amplification, thus being able to amplify the audio signal from the audio player 25 and output the amplified audio signal from the speakers.

It is assumed that the "non-operative state" of the personal computer 10 includes states called "standby/sleep/suspend" (system state S3) and "hibernation" (hibernate state) (system state S4), as well as a power-off state (system state S5). In short, the non-operative state is a state in which the processor (CPU 30) does not operate.

The personal computer 10 in the embodiment executes, based on a request from a user, control to enable sound corresponding to an analog audio signal, which is output from the audio player 25, to be output from the speakers even in the non-operative state. The request from the user, which relates to the audio output function, is discriminated, for example, by the setting of enable/disable of the audio output function corresponding to the instruction from the user, or the detection of the state of various sensors and switches provided in the personal computer 10, which are switched by the user's operation.

FIG. 1 is a perspective view showing the state in which a display unit of the personal computer 10 is opened. The personal computer 10 comprises a computer main body 11 and a display unit 12. A display device, which is composed of an LCD (Liquid Crystal Display) 17, is built in the display unit 12. The display screen of the LCD 17 is disposed at a substantially central part of the display unit 12.

The display unit 12 is attached to the computer main body 11 by hinge mechanisms 21 such that the display unit 12 is rotatable between an open position and a closed position, relative to the computer main body 11. The hinge mechanisms 21 include an LCD open/close sensor 55 (see FIG. 2) for detecting the state in which the display unit 12 is in the open state (i.e. the position where the display 12 is not put in close contact with the computer main body 11). The computer main body 11 has a thin box-shaped housing, to which a battery is detachably attached.

A keyboard 13, a power button switch 14 for power-on/power-off, general-purpose hardware buttons 15, a touch pad 16, and speakers 18 are disposed on the top surface of the computer main body 11.

Since the speakers 18 are disposed on the top surface of the computer main body 11, the front surfaces of the speakers 18 are covered if the display unit 12 is in the closed position. In other words, a sound with a normal volume/sound quality cannot be produced from the speakers 18. The LCD open/close sensor 55 detects, as the open position, the state in which the front surfaces of the speakers 18 are opened to such a degree that a sound with a sufficient volume/sound quality can be produced from the speakers 18, that is, the state in which the display unit 12 is opened to a predetermined degree or more.

A side surface of the computer main body 11 is provided with a line-in terminal 19 (jack) for receiving an analog audio signal which is output from the audio player 25, and a volume dial 20 which is used for volume control in the case where the audio output function is enabled at the non-operative state. A cable 26, which is connected to a line-out terminal of the audio player 25, can be connected to the line-in terminal 19 by a plug 27.

Figure 2:
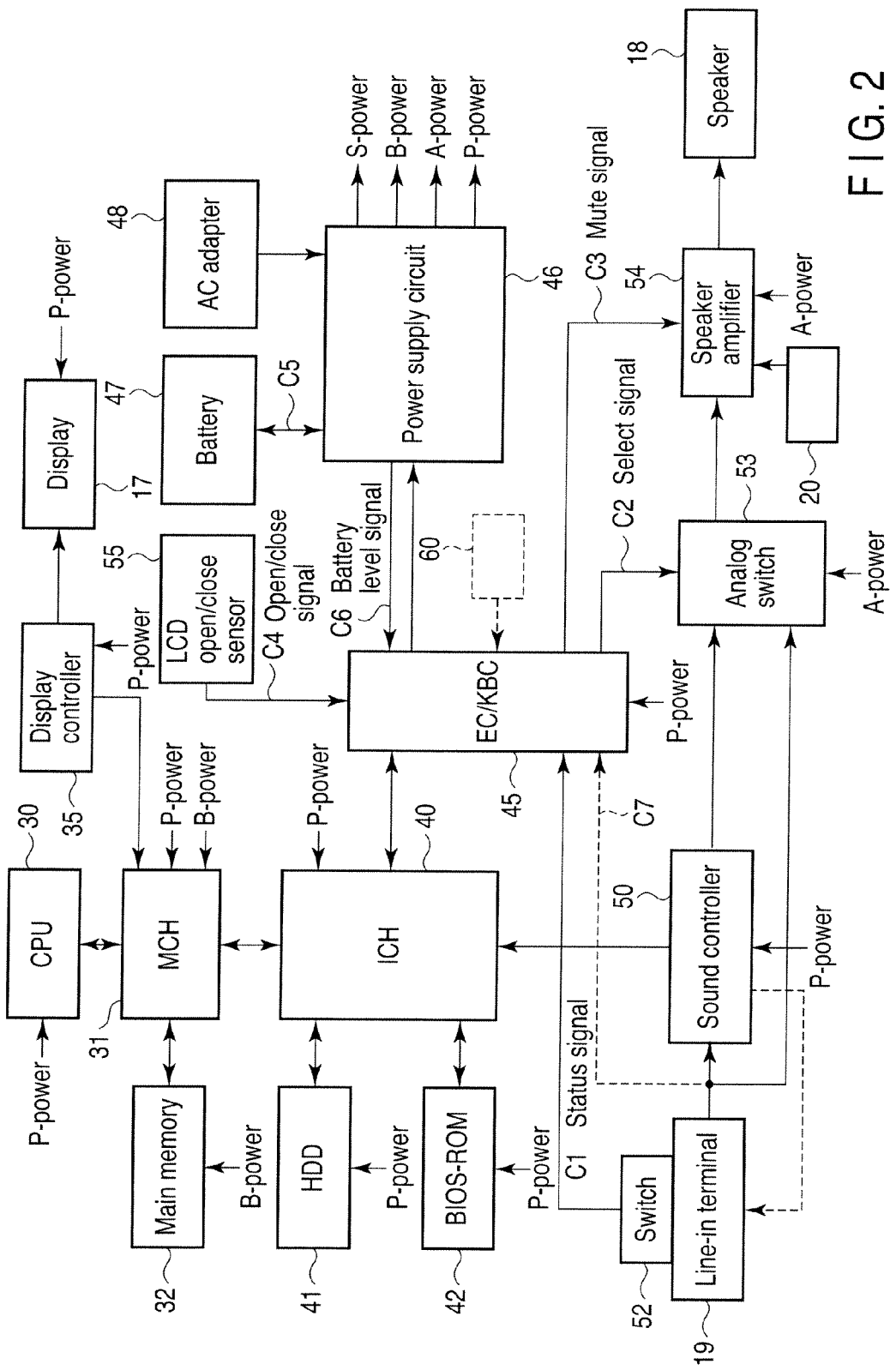
FIG. 2 is an exemplary block diagram showing the system configuration of a personal computer according to the embodiment.

Next, referring to FIG. 2, a description is given of the system configuration of the personal computer 10 according to the embodiment.

The personal computer 10, as shown in FIG. 2, includes a CPU 30, an MCH 31 (north bridge), a main memory 32, a display controller 35, an ICH 40 (south bridge), a hard disk drive (HDD) 41, a BIOS-ROM 42, an embedded controller/keyboard controller IC (EC/KBC) 45, and a power supply circuit 46.

The CPU 30 is a processor which is provided in order to control the operation of the personal computer 10, and executes an operating system (OS), drivers for controlling various hardware, and various application programs, which are loaded from the HDD 41 into the main memory 32. The CPU 30 also executes a system BIOS (Basic Input/Output System) which is stored in the BIOS-ROM 42. The system BIOS is a program for hardware control.

The MCH 31 is a bridge device which connects a local bus of the CPU 30 and the ICH 40. The MCH 31 incorporates a memory controller for access-controlling the main memory 32.

The display controller 35 controls the LCD 17 which is used as a display monitor of the personal computer 10. Based on an image-rendering request which is sent from the CPU 30 via the MCH 31, the display controller 35 executes a display process (graphics arithmetic process) for rendering frames in a video memory (VRAM).

The ICH 40 incorporates an IDE (Integrated Drive Electronics) controller and a Serial ATA controller for controlling the HDD 41 and an optical disc drive (not shown).

The embedded controller/keyboard controller IC (EC/KBC) 45 is a one-chip microcomputer in which an embedded controller for power management and a keyboard controller for controlling the keyboard (KB) 13, touch pad 15 and general-purpose hardware buttons 18 are integrated.

The EC/KBC 45 has a function of controlling the power supply circuit 46 in accordance with an operation of the power button switch 14 by a user, and powering on/off the personal computer 10. The power-on/off control of the personal computer 10 is executed by the cooperation between the EC/KBC 45 and power supply circuit 46. In addition, the EC/KBC 45 is a module which is supplied with power even when the personal computer 10 is in a non-operative state (power-off state), and is used as a controller for controlling the audio output function (sleep & music function) which is used when the personal computer 10 is in the non-operative state. In order to control the audio output function, the EC/KBC 45 receives an open/close signal C4 from the LCD open/close sensor 55, which indicates whether the display unit 12 is in the closed position or not, and receives a battery level signal C6 from the power supply circuit 46, which indicates the residual capacity of the battery 47. The open/close signal C4 is, for example, a 1-bit signal. For example, if the open/close signal C4 is "1", the open/close signal C4 indicates that the display unit 12 is in the open position ("OPEN"). If the open/close signal C4 is "0", the open/close signal C4 indicates that the display unit 12 is in the closed position ("CLOSE").

If a controller, which is operable in a power-off state, is provided in addition to the EC/KBC 45, the audio output function may be controlled by this controller.

The power supply circuit 46 receives power from a battery 47 which is attached to the computer main body 11 or from an external power supply which is connected via an AC adapter 48, and generates and supplies operation power to the respective components. The power supply circuit 46 is provided with a power supply microcomputer. The power supply microcomputer monitors the power supply (charge/discharge) relating to the respective components and the battery, and the charging state of the battery.

The power supply circuit 46 switches the power supply to the respective modules by the control of the EC/KBC 45, in accordance with the system state of the personal computer 10. By the control of the EC/KBC 45 according to the system state of the personal computer 10, the power supply circuit 46 can turn on/off the power supply of power supply systems of an S-power, a B-power, an A-power and a P-power.

The S-power is a power which is always supplied even in the state in which the system is powered off, and is supplied to the EC/KBC 45.

The B-power is a power which is supplied in a standby state in order to back up data which is recorded in the main memory 32.

The A-power is a power for enabling the audio output function when the personal computer 10 is in the non-operative state, and is supplied to an analog switch 53 and a speaker amplifier 54, which process an analog audio signal.

The P-power is a power which is supplied when the personal computer 10 is in the power-on state.

FIG. 3 shows powers which are supplied in the respective states (system states S0, S3, S4 and S5) of the personal computer 10.

As shown in FIG. 3, when the personal computer 10 is in the power-on state (S0) (operative state), the power supply circuit 46 turns on power supply of all of the S-power, B-power, P-power and A-power.

When the personal computer 10 is in the standby state (S3) (or in the sleep/suspend state), the power supply of the S-power and B-power is turned on. However, in the personal computer 10 of the present embodiment, in order to use the audio output function in the standby state, the supply of the A-power is further turned on when the plug 27 for connection of the cable 26 (portable audio player 25) is inserted in the line-in terminal 19, thereby to supply power to the analog switch 53 and speaker amplifier 54 which are operated in the audio output function.

When the personal computer 10 is in the power-off state (S5) or in the hibernation (hibernate state) (S4) in which backup for the main memory 32 is unnecessary, only the supply of the S-power is turned on. However, in the personal computer 10 of the present embodiment, in order to use the audio output function in the power-off state, the supply of the A-power is further turned on when the plug 27 for connection of the cable 26 (portable audio player 25) is inserted in the line-in terminal 19, thereby to supply power to the analog switch 53 and speaker amplifier 54 which are operated in the audio output function. In FIG. 3, the ON/OFF of the A-power is illustrated as the ON/OFF of the power supply mode.

Since the S-power is supplied to the EC/KBC 45, the power supply is turned on in any one of the system states and the control of the audio output function at the non-operation time is enabled.

The sound controller 50 (audio codec) converts digital audio data, which is input via the ICH 40, to an analog audio signal, and outputs the analog audio signal to the analog switch 53 by adjusting a volume or a sound quality (sound effect) by the control of the OS, device driver, audio playback program, etc. Similarly, when the personal computer 10 is in the operative state, the sound controller 50 executes volume control of an analog audio signal from the audio player 25, which is input via the line-in terminal 19, and outputs the resultant analog audio signal to the analog switch 53.

The analog switch 53 switches the path between the sound controller 50 side and the line-in terminal 19 side, in accordance with a select signal C2 from the EC/KBC 45. Under the control of the EC/KBC 45, the analog switch 53 is changed over to the sound controller 50 side when the personal computer 10 is in the operative state. When the audio output function is enabled at the non-operation time, the analog switch 53 is changed over to the line-in terminal 19 side, with the sound controller 50 being bypassed.

The speaker amplifier 54 amplifies the analog audio signal which is input via the analog switch 53, and outputs sound corresponding to the audio signal from the speakers 18. The speaker amplifier 54 can switch the mute/mute-release of sound in accordance with a mute signal C3 from the EC/KBC 45.

A switch (or sensor) 52 is incorporated in the line-in terminal 19. The ON/OFF of the switch 52 is changed by the insertion of the plug 27 for connection of the cable 26 in the line-in terminal 19, and the switch 52 outputs a status signal C1 corresponding to the ON/OFF state to the SC/NBC 45.

Next, the operation of the personal computer 10 in the embodiment is described.

FIG. 4 is a flow chart illustrating an audio output mode select process in the embodiment. The audio output mode select process is a process for selecting enable/disable of audio output by the audio output function, in accordance with the user's instruction, when the personal computer 10 is in the non-operative state.

The audio output mode select process in the embodiment can be executed, for example, in the process of BIOS setup or hardware setup. For example, the BIOS setup can be started and executed by performing a predetermined key operation at the time of powering on. The hardware setup can be executed by starting a utility program (or an application program) for hardware setup. In the present embodiment, the audio output mode select process may be executed by either of these methods.

If the execution of the audio output mode select process is instructed, the CPU 30 causes the LCD 17 to display an audio output mode select screen (block A1).

Figure 5:
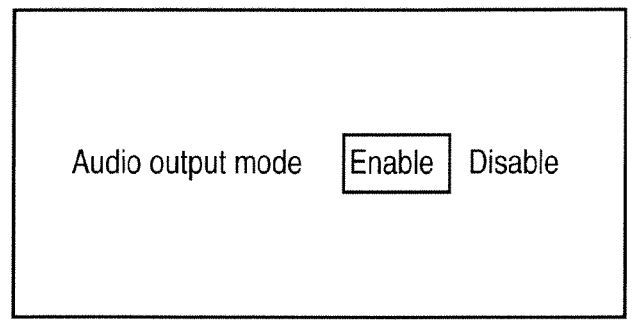
FIG. 5 is an exemplary view showing an audio output mode select screen in the embodiment.

FIG. 5 shows an example of the audio output mode select screen. On the audio output mode select screen, the audio output mode can be set at "Enable" or "Disable".

If an instruction to select "Enable" or "Disable" is input, for example, by the user's operation of the keyboard 13 (block A2), and if the determination of selection is instructed (Yes in block A3), the data indicative of the audio output mode, that is, the data indicative of "Enable" or "Disable", is recorded in the nonvolatile memory (block A4). The data indicative of the audio output mode, which is recorded in the nonvolatile memory, is commonly updated in either of the case where the audio output mode select process has been executed by the BIOS setup or the case where the audio mode select process has been executed by the hardware setup.

As the nonvolatile memory which records the data indicative of the audio output mode, use may be made of, as well as the BIOS-ROM 42, other recording media if recorded data can be read in a power-off process, which will be described later.

Figure 6:
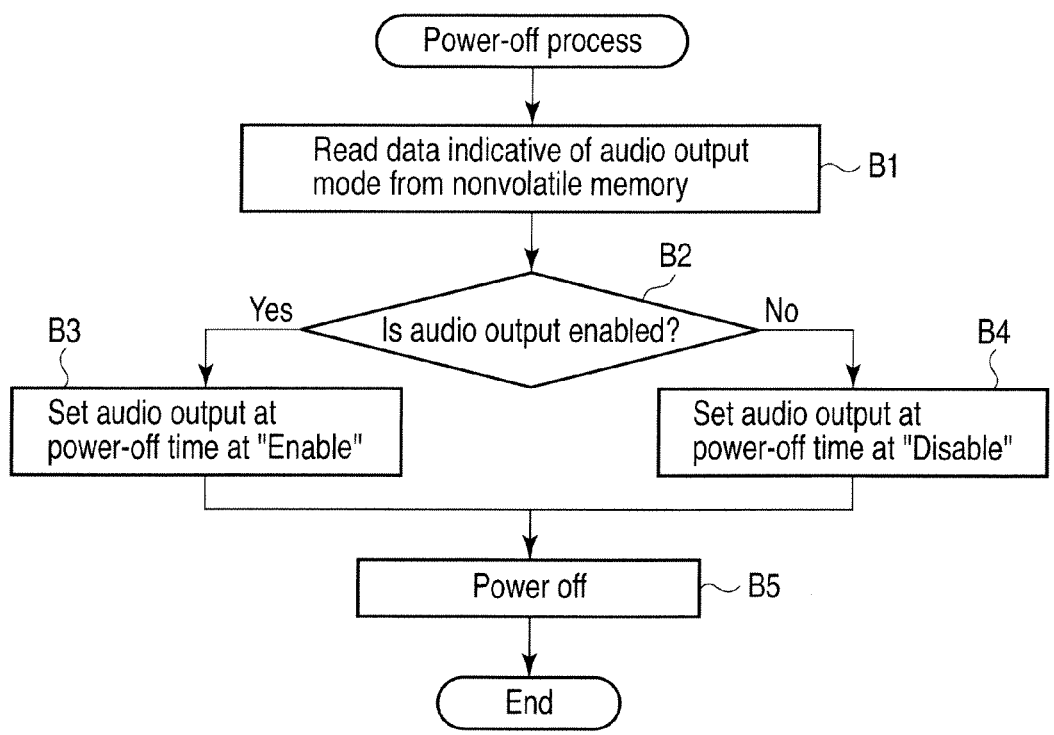
FIG. 6 is an exemplary flow chart illustrating a power-off process in the embodiment.

FIG. 6 is a flow chart illustrating the power-off process in the embodiment.

The CPU 30 starts the power-off process when power-off is requested in accordance with an instruction from the user or in accordance with a request from a program. The "power-off" refers to the setting of the personal computer 10 in the non-operative state, and "power-off" includes not only the complete power-off (S0), but also states called standby/sleep/suspend (S3) and hibernation (hibernate) (S4).

The CPU 30 reads from the nonvolatile memory (e.g. BIOS-ROM 42) the data indicative of the audio output mode by the audio output mode select process (block B1).

If the data indicative of the audio output mode is "Disable" of audio output (No in block B2), the CPU 30 sets the PC/NBC 45 to disable audio output at the non-operative state (block B4). Specifically, the CPU 30 copies the data indicative of "Disable" of the audio output mode in a predetermined flag register of the EC/NBC 45.

On the other hand, if the data indicative of the audio output mode is "Enable" of audio output (Yes in block B2), the CPU 30 sets the EC/NBC 45 to enable audio output when the non-operative state (block B3). Specifically, the CPU 30 copies the data indicative of "Enable" of the audio output mode in the predetermined flag register of the SC/NBC 45.

Then, the personal computer 10 is powered off (non-operative state) (block B5).

Next, a description is given of the control operation of the audio output function (power supply mode) by the EC/NBC 45 after the transition to the non-operative state in the embodiment. In the embodiment, ON/OFF controls of the audio output function (power supply mode) based on requests from the user are executed as shown below in (1), (2) and (3). The respective ON/OFF controls are described as Specifications 1, 2 and 3.

(1) Specification 1

In Specification 1, immediately after power-off, even if the plug 27 is inserted in the Line-in terminal 19 in order to connect the audio player 25, no sound is output from the speakers 18. If the plug 27 is inserted once again thereafter, the audio output function is enabled.

For example, assume now that when the personal computer 10 is in the power-on state, the audio player 25 is connected to the personal computer 10, and music, which is played back by the audio player 25, is output by using the speakers 18. Despite power-off (or sleep or hibernation) being executed in order for the user to end the use of the personal computer 10, if the music is continuously being output after the transition to the non-operative state because the audio output function is enabled, it is possible that the user may feel unnaturalness.

In the personal computer 10 of the embodiment, immediately after the power-off has been instructed by the user and the transition has been made to the non-operative state, the audio output function is disabled so as not to produce sound from the speakers 18. Specifically, the power supply mode is kept in the OFF state. Then, if the plug 27 is detached from the line-in terminal 19 by the user and the plug 27 is inserted once again in the line-in terminal 19, it is determined that an explicit request to use the audio output function has been made by the user, and the audio output function is enabled (the power supply mode is turned on).

In the case where power-off is executed in the state in which the plug 27 is detached from the line-in terminal 19, if the audio output function is set at "Enable", the audio output function is enabled (the power supply mode is turned on) when the plug 27 is inserted after the transition to the non-operative state.

(2) Specification 2

In Specification 2, no sound is produced from the speakers 18 when the display unit 12 is in the closed position.

In the case of the housing structure in which the computer main body 11 and the display unit 12 are coupled by the hinge mechanisms 12, as shown in FIG. 1, if the display unit 12 is set in the closed state, the opening parts of the speakers 18, which are provided on the top surface of the computer main body 11, are covered. Even if the audio output function is enabled and audio from the audio player 25 is output from the speakers 18 when the display unit 12 is in the closed position, a sound with a normal volume/sound quality cannot be produced. Specifically, when the user makes use of the audio output function, the user rotates the display unit 12 to the open position so as to output good sound from the speakers 18. Thus, when the display unit 12 is in the closed position, it can be determined that the user does not intend to use the audio output function.

In the personal computer 10 of the embodiment, the EC/KBC 45 monitors the open/close signal C4 from the LCD open/close sensor 55. When it is determined that the display unit 12 is not in the open position, the audio output function is disabled so as not to produce sound from the speakers 18. In the case of such a structure that sufficient opening areas are secured on the front surfaces of the speakers 18 even when the display unit 12 is in the closed position, the ON/OFF control of the audio output function based on the position of the display unit 12 is needless.

(3) Specification 3

In Specification 3, when the residual capacity of the battery 47 is less than a predetermined value, no sound is produced from the speakers 18.

When the AC adapter 48 is not connected and thus battery driving is performed, the power of the battery 47 would be consumed if the audio output function is used in the non-operative state of "sleep" or "hibernation". If the output of sound is continued by the audio output function until the residual capacity of the battery 47 is emptied, forcible power-off is done and normal resume cannot be effected. When the transition to the sleep or hibernation is instructed by the user, the re-use of the personal computer 10 is intended and, therefore, the ON/OFF of the audio output function is controlled so that normal resume can be executed.

In the personal computer 10 of the embodiment, when the residual capacity of the battery 47 has decreased to a value less than a predetermined value, at which normal resume cannot be executed, the audio output function is disabled (the power supply mode is turned off) so that no sound is produced from the speakers 18.

Next, the control processes of the respective Specifications 1 to 3 are described.

The control process for realizing Specification 1 (basic control process) is illustrated in flow charts of FIG. 7 and FIG. 8.

To start with, when a transition has occurred to the non-operative state (system state S3, S4, S5), the EC/KBC 45 turns off the power supply mode, regardless of whether the plug 27 is inserted in the line-in terminal 19 (block C1 in FIG. 7). Specifically, the EC/KBC 45 turns off the supply of powers (P-power or B-power) corresponding to the system state, including the A-power by the power supply circuit 46.

Thereafter, when the EC/KBC 45 detects, based on the status signal C1, that the plug 27 has been detached from the line-in terminal 19, the BC/NBC 45 accepts an interrupt and executes power supply mode change control.

If the BC/NBC 45 detects that the plug 27 has been detached from the line-in terminal 19 ("Unplug" in block D1), the power supply mode is simply turned off (block D2).

On the other hand, if the BC/NBC 45 detects that the plug 27 has been inserted in the line-in terminal 19 ("Plug" in block D1), the BC/NBC 45 enables the audio output function (the power supply mode is turned on) so that sound can be produced from the speakers 18, if the following conditions (a1), (b1) and (c1) are satisfied (block D6). The details of the control, which is associated with the ON/OFF switching of the power supply mode, will be described later (see FIG. 11).

(a1) The audio output mode (audio output function) is set at "Enable" in the flag register ("Enable" in block D3).

(b1) Based on the open/close signal C4 from the LCD open/close sensor 55, it is determined that the display unit 12 is in the open position ("OPEN" in block D4).

(c1) Based on the battery level signal C6 from the power supply circuit 46, it is determined that the residual capacity of the battery 47 is a predetermined value or more ("Predetermined value or more" in block D5).

If any one of the conditions (a1), (b1) and (c1) in blocks D3, D4 and D5 fails to be satisfied, the EC/KBC 45 turns off the power supply mode (i.e. disables the audio output function) (block D7).

The control process for realizing Specification 2 is illustrated in a flow chart of FIG. 9.

An open/close interrupt control flow chart of FIG. 9 is added to the basic control flow charts of FIG. 7 and FIG. 8.

When the EC/KBC 45 detects, based on the open/close signal C4, that the open/close state of the display unit 12 has been changed, the EC/KBC 45 accepts an interrupt and executes the power supply mode switching control.

If the EC/KBC 45 detects that the display unit 12 has been rotated to the closed position ("CLOSE" in block F1), the EC/KBC 45 simply turns off the power supply mode (block F2).

On the other hand, if the EC/KBC 45 detects that the display unit 12 has been rotated to the open position ("OPEN" in block F1), the EC/KBC 45 enables the audio output function (the power supply mode is "ON") if the following conditions (a2), (b2) and (c2) are satisfied, and enables the output of sound from the speakers 18 (block F6).

(a2) The audio output mode (audio output function) is set at "Enable" in the flag register ("Enable" in block F3).

(b2) Based on the status signal C1 from the switch 52, it is determined that the plug 27 is inserted in the line-in terminal 19 ("plugged" in block F4).

(c2) Based on the battery level signal C6 from the power supply circuit 46, it is determined that the residual capacity of the battery 47 is a predetermined value or more ("Predetermined value or more" in block F5).

If any one of the conditions (a2), (b2) and (c2) in blocks F3 to F5 fails to be satisfied, the EC/KBC 45 turns off the power supply mode (i.e. disables the audio output function) (block F7).

A flow chart of FIG. 10 illustrates the control process for realizing Specification 3.

A battery residual capacity control flow chart of FIG. 10 is added to the basic control flow charts of FIG. 7 and FIG. 8.

When the EC/KBC 45 detects, based on the battery level signal C6, that the residual capacity of the battery 47 has decreased by, e.g. 1%, the EC/KBC 45 accepts an interrupt and performs the power supply mode switching determination.

The EC/KBC 45 determines whether the residual capacity of the battery 47, which is indicated by the battery level signal C6, is a predetermined value or more. If the residual capacity of the battery 47 is not the predetermined value or more ("Less than predetermined value" in block G1), the EC/KBC 45 simply turns off the power supply mode (block G2).

On the other hand, when the residual capacity of the battery 47 is the predetermined value or more ("Predetermined value or more" in block G1), if the following conditions (a3), (b3) and (c3) are satisfied, EC/KBC 45 enables the audio output function (i.e. the power supply mode is "ON"), and enables output of sound from the speakers 18 (block G6).

(a3) The audio output mode (audio output function) is set at "Enable" in the flag register ("Enable" in block G3).

(b3) Based on the status signal C1 from the switch 52, it is determined that the plug 27 is inserted in the line-in terminal 19 ("plugged" in block G4).

(c3) Based on the open/close signal C4 from the LCD open/close sensor 55, it is determined that the display unit 12 is in the open position ("OPEN" in block G5).

If any one of the conditions (a2), (b2) and (c2) in blocks 53 to 55 fails to be satisfied, the EC/BC 45 turns off the power supply mode (i.e. disables the audio output function) (block G7).

In this manner, in each of the cases of Specifications 1, 2 and 3, if the audio output function is set at "Enable" by the user, if the plug 27 is inserted in the line-in terminal 19 in order to connect the audio player 25, if the display unit 12 is rotated to the open position so that sound is output in good condition from the speakers 18 and if the residual capacity of the battery 47 is a predetermined value or more, it is then determined that the user requests the audio from the audio player 25 be output from the speakers 18 even when the non-operative state, and the audio output function is enabled (the power supply mode is turned on).

Figure 11:
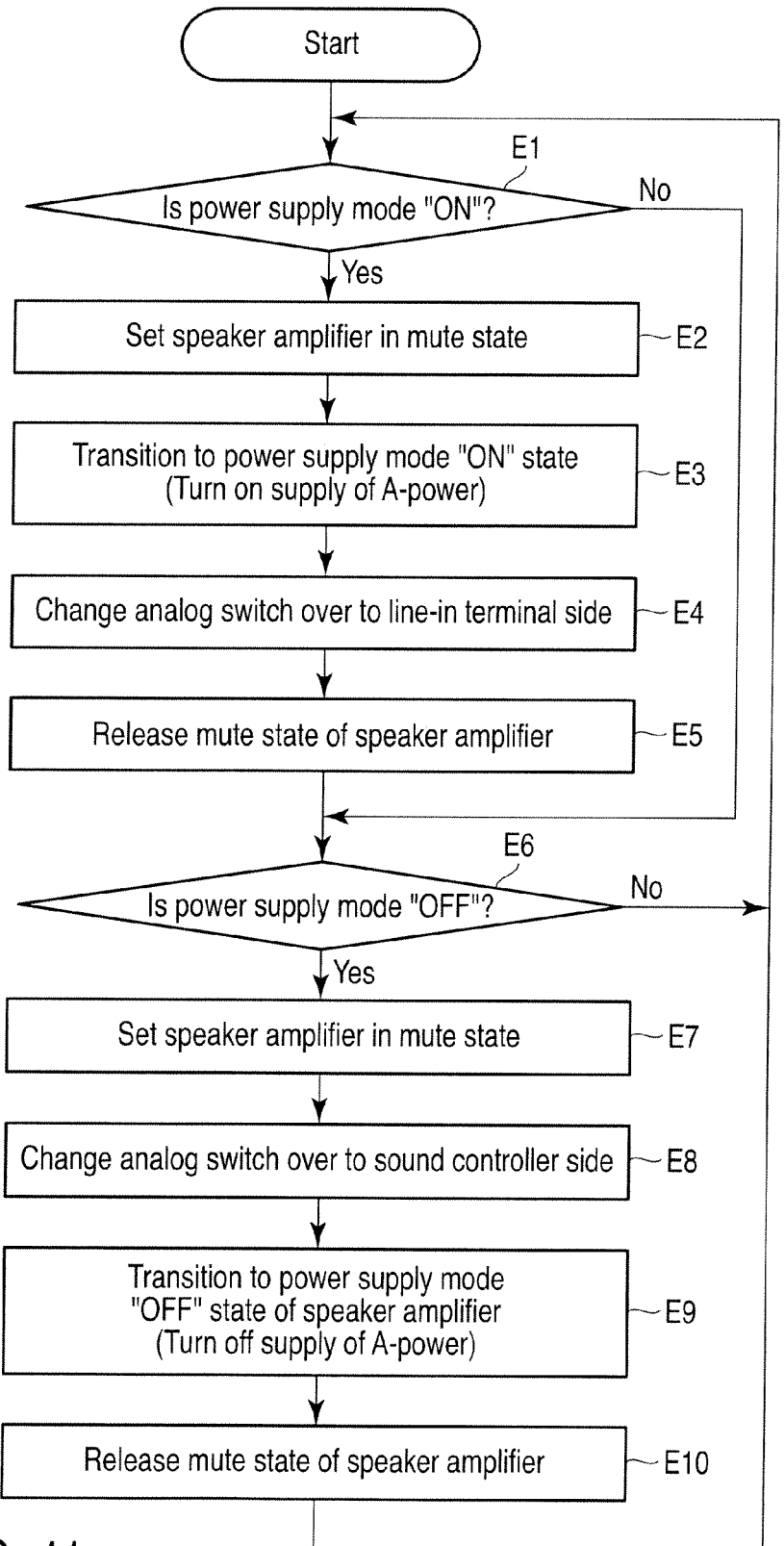
FIG. 11 is an exemplary flow chart illustrating an ON/OFF control of a power supply mode of an EC/KBC in a non-operative state in the embodiment.

Next, referring to a flow chart of FIG. 11, a description is given of the details of the ON/OFF control of the power supply mode of the EC/KBC 45 in the non-operative state.

When the power supply mode is to be turned on (Yes in block E1), the EC/KBC 45 sets the speaker amplifier 54 in the mute state by the mute signal C3 (block E2). Specifically, since noise occurs at the time of powering on the speaker amplifier 54 or at the time of changing over the analog switch 53, sound is prevented from being output from the speakers 18 by the speaker amplifier 54.

After the speaker amplifier 54 is set in the mute state, the EC/KBC 45 causes the power supply circuit 46 to turn on the supply of the A-power (block E3), and transitions the power supply mode to the ON state. Specifically, with the personal computer 10 being kept in the non-operative state, the A-power is supplied to only the speaker amplifier 54 and analog switch 53 which are associated with the audio output function.

The sound controller 50 does not operate in the standby mode which is controlled by the program. Thus, the EC/KBC 45 controls the analog switch 53 by the select signal C2, thereby switching the path so that the analog audio signal that is input from the line-in terminal 19 may go to the speaker amplifier 54, with the sound controller 50 being bypassed (block E4).

After the change-over of the analog switch 54 is completed, the EC/KBC 45 releases the mute state of the speaker amplifier 54 by the mute signal C3 (block E5).

After the audio output function is enabled (the power supply mode is turned on), if music, for instance, is played back by the audio player 25 which is connected to the line-in terminal 19, the analog audio signal of the music is input to the speaker amplifier 54 via the line-in terminal 19. Since the speaker amplifier 54 is supplied with the A-power from the power supply circuit 46, the speaker amplifier 54 can amplify the analog audio signal and can output the music from the speakers 18. At this time, the personal computer 10 is in the standby state and the modules, which are not associated with the audio output function, are supplied with no power. Thus, the power consumption of the personal computer 10 can be made much lower than in the case where the personal computer 10 is in the power-on state.

When the power supply mode is to be turned off (Yes in block E6), the EC/KBC 45 sets the speaker amplifier 54 in the mute state by the mute signal C3 (block E7).

After setting the speaker amplifier 54 in the mute state, the EC/KBC 45 controls the analog switch 53 by the select signal C2, thereby changing the analog switch 53 over to the sound controller 50 side and switching the path so that the analog audio signal that is input from the line-in terminal 19 may go to the speaker amplifier 54 via the sound controller 50 (block E8).

Thereafter, the EC/KBC 45 causes the power supply circuit 46 to turn off the supply of the A-power (block E9), and transitions the power supply mode to the OFF state.

Specifically, in the case of the power-off (S5) or hibernation (S4), only the S-power is supplied. In the case of the standby mode (S3), the supply of the B-power and S-power is turned on. In other words, the supply of the A-power to the analog switch 53 and speaker amplifier 54 is turned off.

After the switching of the power supply is completed, the EC/KBC 45 releases the mute state of the speaker amplifier 54 by the mute signal C3 (block E10).

In this manner, in the personal computer 10 of this embodiment, in the case where the power supply mode is turned on/off by the control process by the above-described Specifications 1, 2 and 3 in the non-operative state such as the power-off state or the standby mode, the ON/OFF of the power supply (A-power) to the speaker amplifier 54 is controlled and the change-over of the analog switch 53 is controlled.

In the above description, the switch 52 detects that the plug 27 has been inserted in the line-in terminal 19 (jack). Alternatively, the volume level of the audio signal that is input from the line-in terminal 19 may be detected. Specifically, the same control as in the case of detecting the insertion of the plug 27 is executed by detecting that music, for instance, is played back by the audio player 25 and audio (music), which is to be output from the speakers 18, is present. Thereby, when the plug 27 is merely inserted in the line-in terminal 19 and there is no sound that is to be output from the speakers 18, no unnecessary power (A-power) is supplied to the speaker amplifier 54 and analog switch 53 and, therefore, power-saving can be achieved.

If the battery 47 can be charged while the audio output function is being used, the power supply mode may always be turned on when the AC adapter 48 is connected (i.e. when battery drive is not performed). In the ordinary notebook-type personal computer 10, the power supply from the AC adapter 48 is greater than the power consumption of the battery 47, and thus the power supply mode can be turned on regardless of the residual battery capacity.

However, in the case where the residual power consumption by the audio output function is greater than the power supply, the audio output function may automatically be enabled when the residual battery capacity has increased to a reference value or more at the time of the connection of the AC adapter 48, and the output of sound from the speakers 18 may be started. In this case, it is assumed that the reference value for starting the audio output is a residual capacity value which is sufficiently higher than the predetermined value for determining the residual capacity of the battery 47. In other words, such a situation is prevented from occurring that the audio output stops due to the deficiency of the residual capacity of the battery 47 immediately after the audio output is started.

In the above description, the line-in terminal 19 has been described as the terminal for audio signal input, but the line-in terminal 19 may be used also as the terminal for microphone connection. In this case, the power for a microphone is supplied to the line-in terminal 19 via the sound controller 50. Since the supply of the P-power to the sound controller 50 is turned off in the power-off state or in the standby mode, the power for the microphone is not supplied to the line-in terminal 19.

The switch 52, which is built in the line-in terminal 19, may be replaced with an independent switch which enables ON/OFF switching by the user's manual operation. The status signal C1 corresponding to the ON/OFF of this switch is input to the EC/KBC 45. In the case of using the portable audio player 25 by connecting it to the personal computer 10, the user can request that the audio output function be enabled, by turning on this switch.

In the above description, when the transition to the non-operative state is effected in the state in which the plug 27 is inserted, the audio output function is enabled when the plug 27 is once detached from the line-in terminal 19 and then the plug 27 is inserted once again (i.e. in the case where the audio output mode is set at "Enable"). Alternatively, the audio output function may be enabled by other methods. For example, as shown in FIG. 2, a switch 60 may be provided for enabling the user to perform a manual operation. In the case where the personal computer 10 is in the non-operative state, if the EC/KBC 45 detects that the switch 60 has been turned on by the user's manual operation, the EC/KBC 45 sets the power supply circuit 46 to turn on the supply of the A-power. Thereby, it is possible to omit such an operation of detaching the plug 27 from the line-in terminal 19 and then inserting the plug 27 once again.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a speaker;
   a terminal configured to input an audio signal from an external device;
   an amplifier configured to amplify the audio signal which is input from the terminal, and to output audio from the speaker;
   a power supply circuit configured to supply power to the amplifier from a battery when power is not supplied externally;
   a switch configured to switch between a first path by which the amplifier is connected to a sound controller operating when the electronic apparatus is in an operative state and a second path by which the terminal and the amplifier are connected to each other without the sound controller;
   a setting module configured to set data which indicates whether audio output from the speaker is to be enabled or disabled;
   a first state detector configured to detect a first state where an external terminal for inputting the audio signal is connected to the terminal; and
   a controller configured to control the switch to select the second path after transition of the electronic apparatus from the operative state to a non-operative state and control the power supply circuit to supply the power from the battery to the amplifier, when a residual charge capacity of the battery is not less than a predetermined value, the data indicates enabling of audio output, and the first state is detected.

2. The electronic apparatus of claim 1, wherein
   the controller is configured to control the power supply circuit in order to supply the power to the amplifier, when the data indicates enabling of audio output and the first state detector detects the first state after transition of the electronic apparatus to the non-operative state.

3. The electronic apparatus of claim 1, further comprising:
a second state detector configured to detect a second state where a front surface of the speaker is open, and
wherein the controller is configured to control the power supply circuit in order to supply the power to the amplifier, when the data indicates enabling of audio output and the second state detector detects that the front surface of the speaker is open after transition of the electronic apparatus to the non-operative state.

4. The electronic apparatus of claim 3, wherein
the controller is configured to control the power supply circuit in order to supply the power to the amplifier, when the data indicates enabling of audio output and the first state and the second state are detected after transition of the electronic apparatus to the non-operative state.

5. An audio signal processing method for an electronic apparatus, the method comprising:
setting data indicating whether audio output from the speaker is enabled or disabled;
detecting whether an external terminal is connected to a terminal supplied with an audio signal from the external apparatus;
inputting the audio signal from the external apparatus through the external terminal connected to the terminal;
switching from a first path, by which an amplifier is connected to a sound controller operating in an operative state, to a second path, by which the terminal and the amplifier are connected to each other without the sound controller, when the data indicates enabling of the audio output, the terminal is connected to the external terminal, and a residual charging capacity of a battery is not less than a predetermined value, after transition of the electronic apparatus from the operative state to a non-operative state; controlling a power supply circuit to continue supplying power from the battery to the amplifier if the power is not supplied externally after the non-operative state starts; and causing the amplifier to amplify the audio signal input to the terminal and outputting the amplified audio signal to the speaker.

6. The method of claim 5, wherein
when the data indicates enabling of audio output, and the terminal is connected to the external terminal, the power is supplied from the battery to the amplifier, after transition of the electronic apparatus to the non-operative state.

7. The method of claim 5, wherein
when the data indicates enabling of audio output and the terminal is connected to the external terminal after transition of the electronic apparatus to the non-operative state, after transition of the electronic apparatus to the non-operative state, the power is supplied from the battery to the amplifier.

8. The method of claim 5, wherein
when the data indicates enabling of audio output and both a state where the terminal is connected to the external terminal and a state where a front surface of the speaker is open are detected after transition of the electronic apparatus to the non-operative state, the power is supplied from the battery to the amplifier.

* * * * *